US006959798B2

(12) United States Patent
Danley

(10) Patent No.: US 6,959,798 B2
(45) Date of Patent: Nov. 1, 2005

(54) DEVICE AND METHOD FOR AVOIDING BANGINGLY SHAKING OF COMPONENTS IN THE PRESENCE OF VIBRATION EVENTS

(75) Inventor: Brooks H Danley, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 236 days.

(21) Appl. No.: 10/222,031

(22) Filed: Aug. 16, 2002

(65) Prior Publication Data

US 2004/0036003 A1 Feb. 26, 2004

(51) Int. Cl.[7] .................................................. F16F 7/12

(52) U.S. Cl. ...................... 188/374; 188/371; 403/375; 464/180

(58) Field of Search ........................ 403/375; 464/180; 188/381, 372, 374, 376, 377

(56) References Cited

U.S. PATENT DOCUMENTS 5,464,251 A * 11/1995 Daumal Castellon ....... 280/777
5,992,939 A * 11/1999 Gass et al. ............... 297/463.1
6,293,587 B1 * 9/2001 Lapic et al. ................ 280/784
6,454,303 B2 9/2002 Ashtiani et al.

* cited by examiner

*Primary Examiner*—Matthew C. Graham
(74) *Attorney, Agent, or Firm*—Jimmy L. Funke

(57) ABSTRACT

Device and method for forming the device are provided. The device is exposed to vibration events from time-to-time and includes at least one component assembled therein. The device includes a spool including a bore defined by an inner section of the spool. The inner section that defines the bore may be configured to receive that component. The device further includes a rib situated on the inner section near an entrance to the bore. The rib may extend about the periphery of the bore entrance. The rib is configured to provide a tight interference-fit upon assembly of the component into the bore, and thus avoid vibration-induced effects between the inner section of the spool and the component therein.

14 Claims, 2 Drawing Sheets

DEVICE AND METHOD FOR AVOIDING BANGINGLY SHAKING OF COMPONENTS IN THE PRESENCE OF VIBRATION EVENTS

BACKGROUND OF THE INVENTION

The present invention is generally related to electrical or electromechanical devices, and, more particularly, to apparatus and techniques for securely affixing components in such devices to avoid bangingly shaking of any components therein in the presence of vibration events.

Electrical or electromechanical devices, e.g., modular devices, used in equipment subject to vibration, such as may be used in automotive, aerospace, and other industrial applications, need to be carefully designed to be substantially unaffected when exposed to any such vibration. For example, these devices may include one or more components, such as electronic, sensor and actuator components. During vibration conditions, some of these components have a tendency to shake, bang or rattle against proximate structures. These vibration-induced-effects could eventually cause these components to have high failure rates, which can result in undesirable and costly down time of the equipment using the device.

More particularly, it would be desirable to avoid such vibration-induced effects (e.g., shaking, rattling, banging, etc.) between an actuator that may be assembled in a bore of a coil device. As suggested above, the shaking, rattling, banging, etc., occurs when the device is vibrated. The coil device is generally made up of a plastic spool wrapped with wire. The vibration causes the entire coil to rapidly jiggle or shake back and forth. Thus, the walls that define the bore of the winding device may uncontrollably impact the actuator surrounded by such walls. The inertia of the coil device could result in an impact large enough to catastrophically damage the actuator or prematurely reduce its performance.

Unfortunately, prior to the present invention, some possible techniques which have tried to address the vulnerability of the components to vibration-induced effects and eventual wear-out have fallen short. For example, previous designs attempted to reduce the vibration-induced effects by tightening the tolerances between the inner diameter of the coil and the outer diameter of the actuator. Unfortunately, such known technique is unable to economically create an appropriate interference fit, thus leaving some room for movement between the affected components.

Thus, it is desirable to provide affixing technique and structure that, at a low-cost, reliably avoids the foregoing issues. It would be further desirable to provide affixing technique and structure that would result in an appropriate interference fit between the affected components and avoid the undesirable vibration-induced effects.

BRIEF SUMMARY OF THE INVENTION

Generally, the present invention fulfills the foregoing needs by providing in one aspect thereof, a device exposed to vibration events from time-to-time. The device includes at least one component assembled therein. The device includes a spool including a bore defined by an inner section of the spool. The inner section that defines the bore may be configured to receive that component. The device further includes a rib situated on the inner section near an entrance to the bore. The rib may extend about the periphery of the bore entrance. The rib is configured to provide a tight interference-fit upon assembly of the component into the bore, and thus avoid vibration-induced effects between the inner section of the spool and the component therein.

The present invention further fulfils the foregoing needs by providing in another aspect thereof, a method of making an electromechanical device. The device includes an actuator assembled therein. The method comprises the following actions:

providing an actuator;

providing a spool;

defining a bore in an inner section of the spool;

configuring the inner section that defines the bore to receive the component;

providing a rib on the inner section near an entrance to the bore, the rib may extend about the periphery of the bore entrance; and configuring the rib to provide a tight interference-fit upon assembly of the actuator into the bore, and thus avoid vibration-induced effects between the inner section of the spool and the actuator therein;

assembling said actuator into said bore of said spool.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
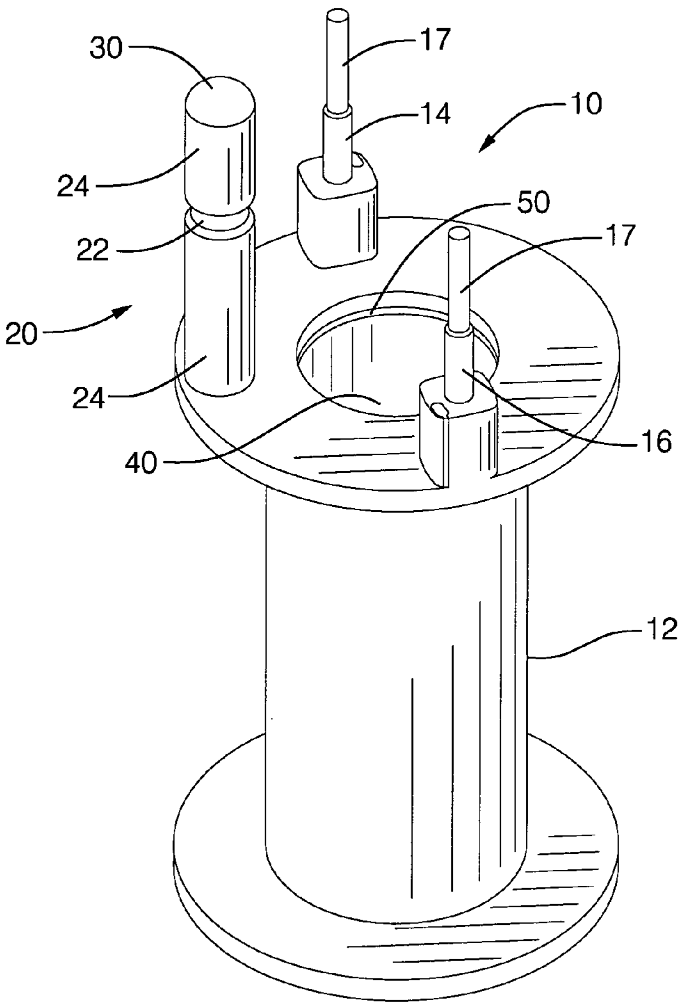
FIG. 1 illustrates an isometric view of an exemplary device embodying aspects of the invention, such as a crushable rib on an inner section of a spool, which rib may be used to provide an effective interference-fit between any components therein and surrounding structures.

FIG. 1 illustrates an isometric view of an exemplary device 10 embodying aspects of the invention. In one exemplary embodiment, device 10 comprises a spool 12 that may be used for carrying a winding, and other associated components (not shown). The spool may be enclosed by a can 11, as can be appreciated in the cross-sectional view of FIG. 2. In one exemplary embodiment, a bore 40 may be used for receiving an electromechanical component, such as valve actuator 60 shown in FIG. 2. One key aspect of the present invention is being able to prevent undesirable banging movement during vibration conditions between actuator 60 that is received by bore 40 and the walls (e.g., inner section) that define the bore. Spool 12 may be constructed of plastic or any suitable polymer that may be molded into any desired configuration using molding techniques well understood by those skilled in the art, such as injection molding. Device 10 may be part of a piece of equipment that may be used in automotive, aerospace, and other industrial applications to provide electrical signals useful to achieve any desired equipment functionality. In one exemplary embodiment, spool 12 may include terminal 17 that in turn may include affixing pads 14 and 16, e.g., soldering pads or equivalent, connectable to a generally thin, flat, and flexible (flex) circuit (not shown). For readers desirous of learning innovative details regarding techniques for securing the flex circuit, reference is made to U.S. patent application Ser. No. 10/222,160, which is herein incorporated by reference.

In one exemplary embodiment, a rib 50, such as a radially-extending crushable rib, may be located about the perimeter of the entrance to bore 40. In one exemplary embodiment, rib 50 is part of the plastic spool 12. The rib is designed to crushably deform as valve actuator 60 is assembled into bore 40. The inner diameter of rib 50 is configured to be sufficiently smaller relative to the outer diameter of actuator 60. This configuration advantageously results in a tight interference-fit between the walls of bore 40 and actuator 60. The inventor of the present invention has innovatively recognized that the tight fit provided by rib 50 eliminates the banging between the otherwise affected components and concomitant issues.

Figure 2:
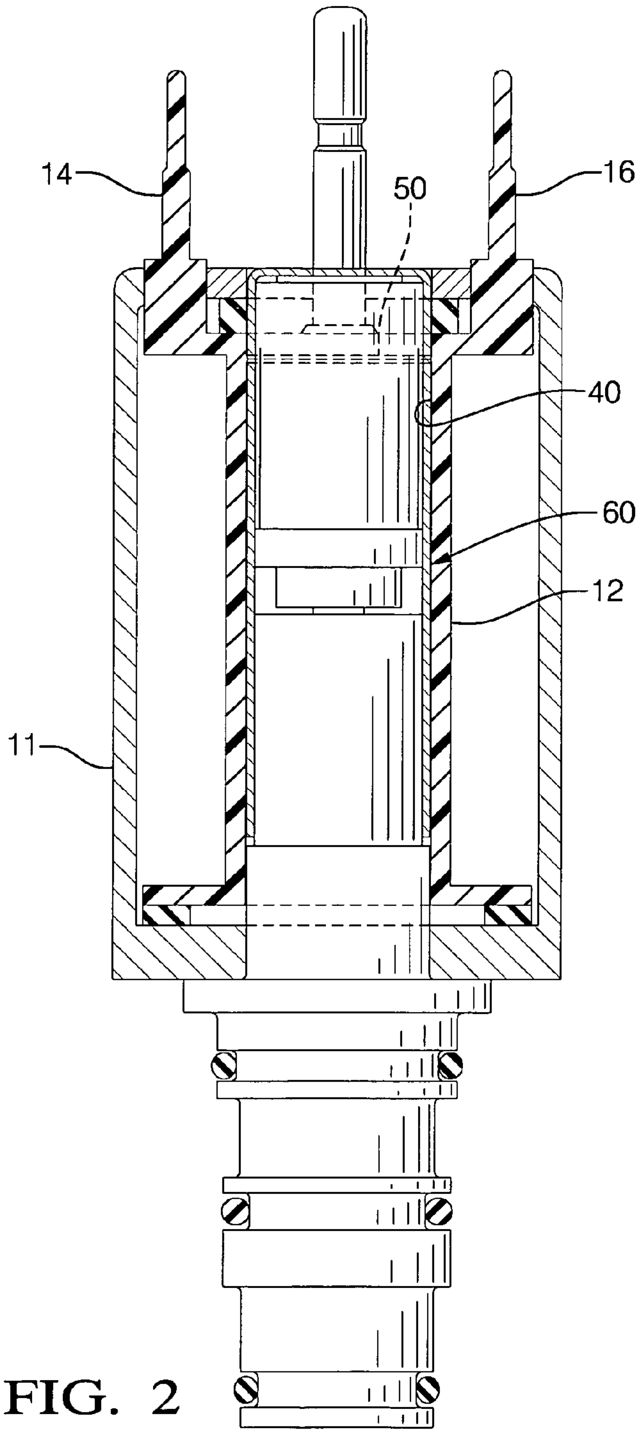
FIG. 2 is a cross-sectional view of the device of FIG. 1, illustrating details regarding a rib that extends radially about the periphery of an entrance to a bore in the inner section of the spool.
Figure 3:
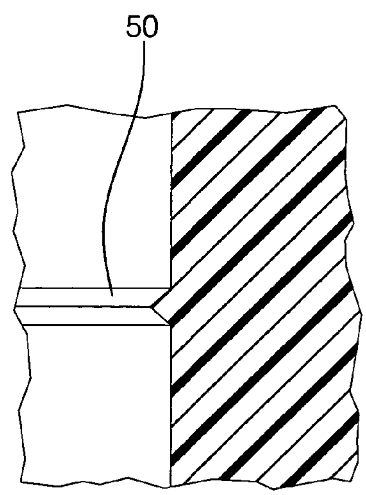
FIG. 3 provides a zoomed-in view of an exemplary rib configuration.

FIG. 2 provides a zoomed-in view of the crusable rib that provides a tight interference fit between the actuator 60 in the bore of spool 12 and the surrounding walls. Although the rib in FIG. 3 is illustrated as a triangular-shaped rib, it will be appreciated by those skilled in the art that the rib may have other configurations, such as rounded, oval, etc.

Figure 5:
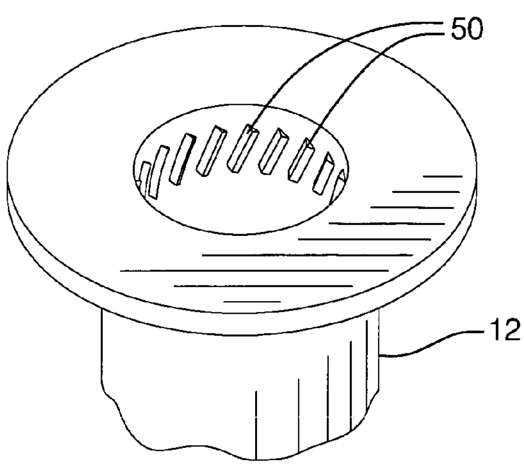
FIGS. 4 and 5 respectively illustrate exemplary embodiments of alternative rib arrangements, in lieu of the radially-extending rib of FIGS. 1–3.
Figure 4:
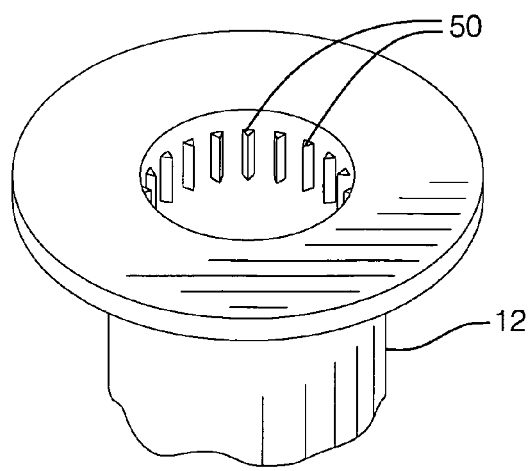

FIGS. 4 and 5 illustrates exemplary embodiments of alternative rib arrangements. For example, as illustrated in FIG. 4, in lieu of providing a single radially extending rib, one may arrange a plurality or relatively short and spaced-apart axially-extending ribs. As illustrated in FIG. 5, the plurality of spaced-apart ribs may be slantingly configured. Thus, depending on the needs of any particular applications, the designer has the flexibility of choosing any desirable rib arrangement.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An electromechanical device comprising:

an actuator;

a spool for carrying a winding including a bore defined by an inner section of the spool, the inner section that defines the bore being configured to receive said actuator;

a rib situated on said wall near an entrance to the bore, the rib extending about the periphery of said entrance, the rib configured to provide a tight interference-fit upon assembly of said actuator into the bore, thereby affixing said actuator in said spool, and thus avoiding vibration-induced effects between the inner section of the spool and the actuator therein.

2. The electromechanical device of claim 1 wherein said rib comprises a crushable rib.

3. The electromechanical device of claim 2 wherein the crushable rib is integrally constructed on the inner section of the spool.

4. The electromechanical device of claim 1 wherein the rib comprises at least one rib extending radially with respect to the axis of the spool about said periphery.

5. The electromechanical device of claim 1 wherein the rib comprises a plurality of spaced-apart ribs extending axially about said periphery.

6. The electromechanical device of claim 1 wherein the rib comprises a plurality of spaced-apart ribs slantingly extending about said periphery.

7. The electromechanical device of claim 1 wherein the vibration-induced effects are selected from the group consisting of shaking, rattling, and banging.

8. A method of making an electromechanical device, the device including an actuator assembled therein, the method comprising:

providing an actuator;

providing a spool;

defining a bore in an inner section of the spool;

configuring the inner section that defines the bore to receive said actuator;

providing a rib on said inner section near an entrance to the bore, the rib extending about the periphery of said entrance;

configuring the rib to provide a tight interference-fit upon assembly of the actuator into the bore, thereby affixing said actuator in said spool, and thus avoiding vibration-induced effects between the inner section of the spool and the actuator therein;

assembling said actuator into said bore of said spool.

9. The method of claim 8 wherein said rib comprises a crushable rib.

10. The method of claim 9 wherein the crushable rib is integrally constructed on the inner section of the spool by molding.

11. The method of claim 8 wherein the action for providing the rib on said inner section further comprises extending at least one rib radially with respect to the axis of the spool about said periphery.

12. The method of claim 8 wherein the action for providing the rib on said inner section comprises providing a plurality of spaced-apart ribs extending axially about said periphery.

13. The method of claim 8 wherein the action for providing the rib on said inner section comprises providing a plurality of spaced-apart ribs slantingly extending about said periphery.

14. The method of claim 8 wherein the vibration-induced effects are selected from the group consisting of shaking, rattling, and banging.

* * * * *